(No Model.)
E. THOMSON.
THERMAL CIRCUIT CLOSER.
No. 490,839. Patented Jan. 31, 1893.
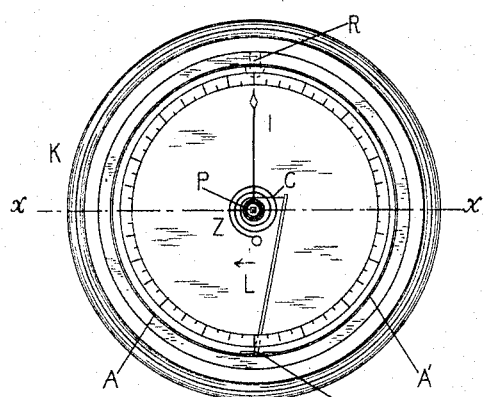
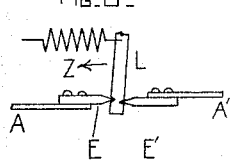
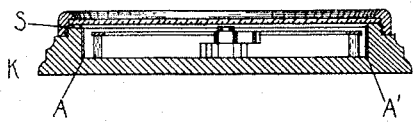
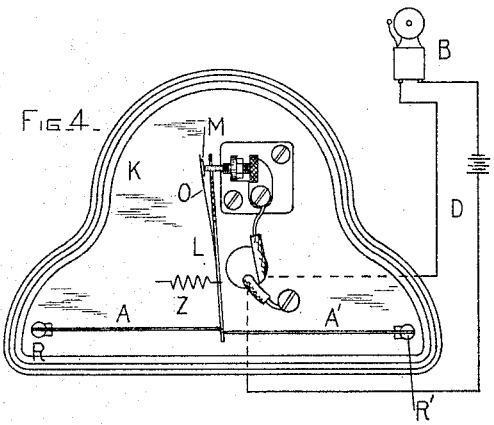
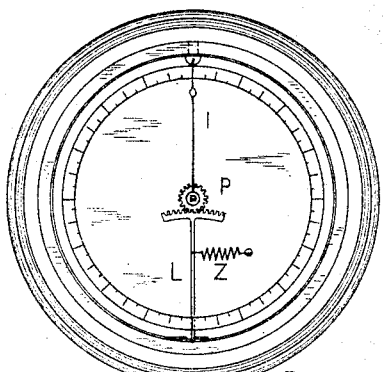
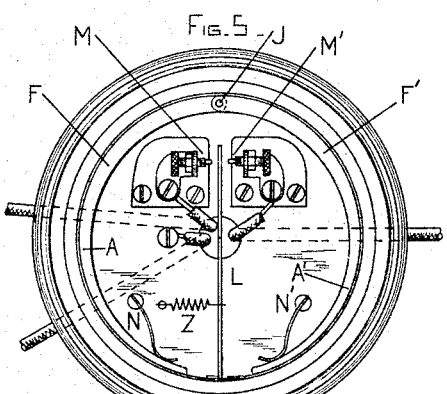
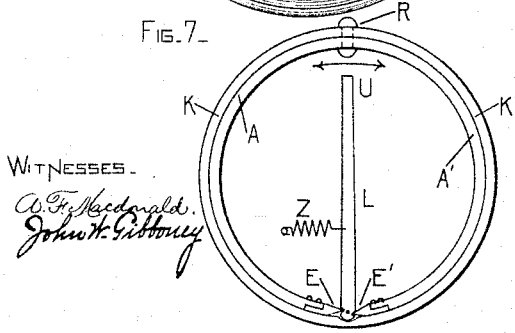
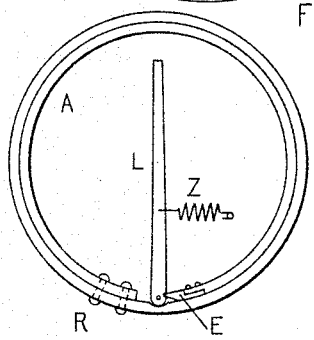
Witnesses —
A. F. Macdonald
John W. Gibboney
Inventor —
Elihu Thomson

UNITED STATES PATENT OFFICE.

ELIHU THOMSON, OF SWAMPSCOTT, MASSACHUSETTS.

THERMAL CIRCUIT-CLOSER.

SPECIFICATION forming part of Letters Patent No. 490,839, dated January 31, 1893.

Application filed October 6, 1892. Serial No. 448,028. (No model.)

*To all whom it may concern:*

Be it known that I, ELIHU THOMSON, of Swampscott, in the county of Essex and Commonwealth of Massachusetts, have invented a new and useful Improvement in Thermal Circuit-Closers and Metallic Thermometers, of which the following is a complete specification.

In the instrument of my invention the differences of expansion of two different metals or other materials are used to close a contact or operate a mechanism on a predetermined increase of temperature, or a decrease beyond a certain point. In the metallic thermometer the same differences of expansion are utilized to indicate on a scale, or otherwise, varying degrees of temperature to which the apparatus is exposed.

My invention consists in utilizing the expansions of different materials in a novel manner, as will be described.

Figure 1 is a face view of a metallic thermometer constructed in accordance with my invention. Fig. 2 is a section through the line X X, Fig. 1. Fig. 3 is a modified construction. Fig. 4 shows a modification in my invention applied to thermostats. Fig. 5 is a further modification for controlling electric contacts in thermostats. Fig. 6 is a diagram illustrating one part of my invention. Figs. 7 and 8 show the principle on which the apparatus acts.

In Fig. 1 K is a circular case containing the mechanism and indicating needle pivoted in the center of the case on a proper bearing, carrying the indicator I which moves over a scale in front of the box, as at S, Fig. 2. Just inside of the case K and bearing against the side thereof is a circular hoop A sprung into place, and riveted or fastened to the case at one point, as at R. This strip, if the case be made of iron, would be a strip of more expansible metal, such as aluminium or brass, having free ends opposite to the point R, as at B. The free ends of this hoop or strip are arranged, as shown in Fig. 6, in which the strip is marked A A', and the ends of which carry edges E E', which are arranged to bear in notches in the sides of a lever L, Figs. 1 and 6, in such manner that the points of bearing are very slightly offset one above the other, E being shown higher than E' in the figure. A coiled spring, as at Z Fig. 1, or Z, Fig. 6, tends to pull the lever over in the direction of the arrow, and thereby tends to exert a force on the edges E E' tending to separate them. This holds the strip A A', Figs. 1 and 2, firmly against the inside of the circular case. Now, it will be evident, that with differences of temperature the position of the lever L will vary on account of the differences of expansion between the two metals, that is the case and the more expansible strip inclosed thereby. It may be here mentioned that if the strip be of less expansibility than the case, as if the case were made of brass or aluminium and the strip of iron or nickel, then the motions during increase and decrease of temperature are simply reversed. A cord or chain, C, Fig. 1, attached to the lever L at its upper extremity, passes around the axis of a small drum carrying the indicator or index I, and changes in the position of the lever, owing to expansion and contraction, differentially, of the case and its inclosed strip, result in the movement of the index I over the scale and the registry of the temperature.

In Fig. 3 the arrangements are substantially the same, with the exception that instead of the spiral spring Z a coiled spring Z is used to hold the lever against the edges E E', and a segment of a gear wheel is attached to the lever L which meshes with a pinion on the center shaft which carries the indicator.

In Fig. 4 the principle of my invention is more distinctly shown by the base plate or backplate K carrying at R R' studs to which are secured strips of more expansible metal than the case A A', the free ends of which approach each other and are offset, as in Fig. 6, against the lever L, held by a spring Z. This lever L carries at its upper point adjustable electric contacts M, which are open and closed in accordance with the relative expansions of the pieces A A' as compared with the casing. D represents an electric circuit including a bell which may be rung on the closure of the contact, and the bell B stands for any other mechanism which may be operated by electric contacts.

In Fig. 5 there is shown a double set of contacts M M', one of which is closed on increased temperature, and the other on decreased temperature, by the lever L bearing to the right or to the left. In this way the apparatus may be used as an indicator or an alarm or a control mechanism for maximum and minimum temperature. There is also shown in this figure the application to the thin strip A A' of two hinged supports or strengthening pieces F, F', pivoted at J to the case containing the mechanism, and curved so as to lie against the expansible strip without being fastened thereto. These curved pieces, F F, are held against the strip by springs N N', shown in the figure. They simply add to the rigidity of the whole mechanism, and enable the strip which operates the lever L, by expansion to be made quite frail or thin. It is of course desirable that for sensitiveness the case and strip be both made of thin metal, and that the points of bearing of the edges E E', Fig. 6, on the lever L be nearly opposite so as to give an enormously large leverage.

The apparatus divested of its parts other than those showing the principle on which it operates is seen in Figs. 7 and 8, where the thickness of the strip A A' has been exaggerated for clearness, while the outer case is shown merely as a ring K K. The lever L is shown in its relation to the edges on the ends of the strip A A', at E E', and is practically pivoted between these edges. In fact a pivot might be used, but it is not necessary. The free upper end U of the lever L will be seen to move to the right or to the left through a considerable range by virtue of the difference of expansion between the material of the case and the strip of more or less expansible material A A' secured therein.

Fig. 8 shows that the point of fastening of a single strip, A, might be, as at R, and that a single edge, E, might bear against a lever pivoted, or otherwise, supported against the edge, the edge E being near the pivot.

When the lever L is used to close a contact, as at M, Fig. 5, a further increase of temperature with the contact closed might cause a buckling or straining of the lever or the strips A A'. To avoid this I secure upon the lever L an auxiliary strip of elastic metal, as at O, Fig. 4, which allows the lever L to continue its movement under the influence of the strips A A' while the contact M is maintained closed.

It is to be understood that the strips A A' might bear against only a portion of the case or ring K K instead of passing entirely around, but I prefer, of course to construct them in the manner above described so as to obtain the maximum movement.

Having now fully described my invention in connection with the accompanying drawings, what I desire to secure by Letters Patent is:—

1. In a thermal circuit closer or temperature indicator, a support, such as a casing, against which a strip of material, of relatively different expansibility, is held by spring pressure, a lever bearing against the free end or ends of said strip, and electric contact or indicator devices adapted to be actuated by the long arm of said lever.

2. The combination with a thermal circuit closer or temperature indicator of a casing having on its interior and bearing against the same a strip of material of different expansibility from the casing, with means, such as a multiplying lever, engaging with the free end or ends of said strip for registering the temperature or for operating electric contacts, as described.

3. The combination in a thermal indicator or thermometer, of a ring support or casing, a strip of material of different expansibility by heat fitting the same, and supported thereby, and edges on the strip at its ends bearing against the side of a lever so as to cause motion of the same, said edges bearing an offset relation to each other, as described.

4. In a thermometer or thermal circuit closer, a continuous casing of one material, and an open strip of different material fitting the same, a lever inserted between the split portion of the strip, as described, and a spring or weight Z tending to separate the free ends of the strip, as and for the purpose described.

5. In a thermal circuit closer or thermometer, two expansible elements, one of which is a strip spring pressed against a curved surface of the other element, and a lever or index adapted to be actuated by the relative movement of said elements.

In witness whereof I have hereunto set my hand, this 30th day of September, 1892, at Lynn, Essex county, Massachusetts.

ELIHU THOMSON.

Witnesses:
JOHN W. GIBBONEY,
BENJAMIN B. HULL.